United States Patent
Kwon

(10) Patent No.: US 9,262,072 B2
(45) Date of Patent: Feb. 16, 2016

(54) APPARATUS AND METHOD FOR CONTROLLING DISPLAY OF AN ELECTRONIC DEVICE

(75) Inventor: Yong-Jin Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1068 days.

(21) Appl. No.: 12/647,805

(22) Filed: Dec. 28, 2009

(65) Prior Publication Data
US 2010/0171753 A1     Jul. 8, 2010

(30) Foreign Application Priority Data

Jan. 5, 2009   (KR) .......................... 10-2009-0000448

(51) Int. Cl.
    *G06F 3/0488*    (2013.01)
    *G06F 1/32*      (2006.01)

(52) U.S. Cl.
    CPC .......... *G06F 3/04883* (2013.01); *G06F 1/3218* (2013.01); *G06F 3/04886* (2013.01); *H04M 2250/22* (2013.01)

(58) Field of Classification Search
    CPC ............................... G09G 2330/021–2330/022
    USPC .................................................. 345/211–213
    See application file for complete search history.

(56) References Cited

U.S. PATENT DOCUMENTS

| | | | | |
|---|---|---|---|---|
| 4,839,634 | A | * | 6/1989 | More et al. ..................... 345/173 |
| 5,881,299 | A | * | 3/1999 | Nomura et al. ................ 713/324 |
| 2003/0128188 | A1 | * | 7/2003 | Wilbrink et al. ............... 345/158 |
| 2004/0233146 | A1 | | 11/2004 | Nguyen |
| 2006/0087502 | A1 | | 4/2006 | Karidis et al. |
| 2009/0006991 | A1 | * | 1/2009 | Lindberg et al. .............. 715/763 |
| 2009/0273568 | A1 | * | 11/2009 | Milner .......................... 345/173 |
| 2010/0020092 | A1 | * | 1/2010 | Canu et al. .................... 345/589 |

FOREIGN PATENT DOCUMENTS

KR    10-2006-0015273 A    2/2006

OTHER PUBLICATIONS

Korean Office Action, Apparatus and Method for Display in a Electronic Device, Application No. 10-2009-0000448, Jul. 24, 2015.

* cited by examiner

*Primary Examiner* — Aaron M Richer
(74) *Attorney, Agent, or Firm* — Jefferson IP Law, LLP

(57) ABSTRACT

A method and apparatus for controlling display of an electronic device are provided. The method includes selecting a specific area of a screen by a user, and switching a display on/off status of the selected specific area of a screen. Wherein, the switching of the display on/off status comprises determining whether display of the specific area is on or off, and, if it is determined that the display of the specific area is on, supplying current to a pixel corresponding to the specific area, and, if it is determined that the display of the specific area is off, discontinuing the supply of the current to the pixel in the specific area.

18 Claims, 10 Drawing Sheets

APPARATUS AND METHOD FOR CONTROLLING DISPLAY OF AN ELECTRONIC DEVICE

PRIORITY

This application claims the benefit under 35 U.S.C. §119 (a) of a Korean patent application filed in the Korean Intellectual Property Office on Jan. 5, 2009 and assigned Serial No. 10-2009-0000448, the entire disclosure of which is hereby incorporated by reference.

BACKGROUND OF THE INVENTION

1. Field of the Invention

The present invention relates to a method and apparatus for controlling display of an electronic device. More particularly, the present invention relates to a method and apparatus for partially turning on/off display of the electronic device.

2. Description of the Related Art

In general, an electronic device uses a display unit to deliver information such as a text, an image, or the like, to a user. When the electronic device needs to deliver the information to the user, the information is displayed by turning on a full screen of the display. When the electronic device does not need to deliver the information, the full screen is turned off. For example, the electronic device (e.g., a mobile phone, a Portable Multimedia Player (PMP), a navigator, an Automated Teller Machine (ATM), a Television (TV) set, a Personal Computer (PC), etc.) displays the information on the full screen when the user requests to display the information, and does not display any information on the full screen when the user does not request to display the information.

Meanwhile, the recent advancement of electrical and electronic industries results in an increase of users' expectations of the electronic device, and thus various service functions are researched and developed to satisfy such expectations. As one of the service functions, the electronic device provides a function related to a user interface to satisfy various users' desires. For example, such a function provided by the electronic device may be a function of controlling brightness of a display unit according to users' desires or a function of turning off the display unit when there is no user input during a specific time period.

The conventional service functions are not enough to satisfy various desires of individual users. For example, information displayed on a screen of the electronic device may be classified into interesting information and non-interesting information according to desires or situations of the individual users. However, such an aspect is not taken into consideration when the electronic device of the related art displays information by turning on/off a full display screen.

Accordingly, there is a need to provide methods for displaying only the interesting information without displaying the non-interesting information in the electronic device to facilitate user convenience.

SUMMARY OF THE INVENTION

An aspect of the present invention is to address at least the above-mentioned problems and/or disadvantages and to provide at least the advantages described below. Accordingly, an aspect of the present invention is to provide a method and apparatus for controlling display of an electronic device.

Another aspect of the present invention is to provide a method and apparatus for partially turning on/off display of an electronic device having a touch screen.

Another aspect of the present invention is to provide a method and apparatus for controlling display in an area touched by a user in an electronic device having a touch screen.

In accordance with an aspect of the present invention, a method for controlling display of an electronic device is provided. The method includes selecting a specific area of a screen by a user, and switching a display on/off status of the selected specific area of the screen.

In accordance with another aspect of the present invention, an apparatus for controlling display of an electronic device is provided. The apparatus includes a processor for identifying a specific area of a screen selected by a user, and a display unit for switching a display on/off status of the specific area of the screen under the control of the processor.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide a method and apparatus for partially turning on/off display of a screen by a user's touch in an electronic device having a touch screen. The display on/off is used as a concept including all situations in which a user can recognize whether a display screen is turned on/off.

Figure 1:
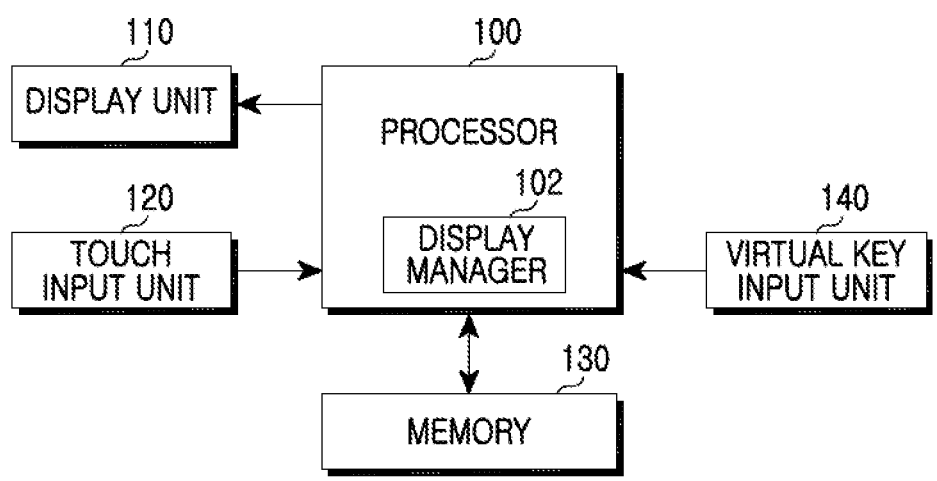
FIG. 1 is a block diagram of an electronic device according to an exemplary embodiment of the present invention.

FIG. 1 is a block diagram of an electronic device according to an exemplary embodiment of the present invention.

Referring to FIG. 1, the electronic device includes a processor 100, a display unit 110, a touch input unit 120, a memory 130, and a virtual key input unit 140. The processor 100 includes a display manager 102.

The processor 100 controls and processes overall operations of the electronic device. Further, the processor 100 includes the display manager 102 to generate and control graphic information to be displayed on the display unit 110. That is, when the virtual input unit 140 receives a signal for announcing an occurrence of a partial display on/off event, the processor 100 receives information on a touched area from the touch input unit 120 and controls and processes a display on/off function for a specific area according to preset environment information. The environment information is setup information regarding a display on/off status. The environment information includes setup information for indicating whether display of the touched area is on or off, whether a display status is reversed, etc., and setup information for indicating whether display is turned on/off in a software manner or a hardware manner.

For example, according to the environment information, the processor 100 may control the display on/off of the touched area, and may reverse a current display status of the touched area. That is, if the touched area is currently in a display-on status, display of the area may be turned off, and if the touched area is currently in a display-off status, display of the area may be turned on. In addition, when a screen touch shape forms a closed curve, the processor 100 may turn on/off display of an inner portion of the closed curve, and may provide a function of increasing or decreasing a size of the touched area.

In addition, when the environment information is set to indicate that display is tuned on/off in a software manner, the processor 100 uses the touched area to determine an area where display is turned off, and thereafter performs a function of setting a color value of an area where display needs to be turned off to a preset color (e.g., black). When the environment information is set to indicate that display is turned on/off in a hardware manner, the processor 100 uses a physical display unit to perform a function of discontinuing a supply of current in the area where display is turned off. The physical display unit is a display unit capable of supplying or discontinuing the supply of current to each pixel. For example, the physical display unit may be an Organic Light Emitting Diode (OLED).

The display unit 110 displays status information generated while the electronic device is operating, numeric characters, alphabetic characters, moving pictures, still pictures, and so on. In particular, the display unit 110 displays graphic information generated by the display manager 102. The display unit 110 may include a Liquid Crystal Display (LCD), an OLED, a Plasma Display Panel (PDP), a Cathode-Ray Tube (CRT), and the like. When the display unit 110 consists of the OLED, the display unit 110 discontinues the supply of current to a specific pixel corresponding to the area where display is turned off under the control of the processor 100.

The touch input unit 120 recognizes an attribute for touching a coordinate corresponding to a screen position touched by a user, and provides the attribute to the processor 100. That is, the touch input unit 120 recognizes a screen touch position, a screen touch direction, a screen touch shape, the number of screen touches, etc., and provides the recognized attribute to the processor 100.

The memory 130 stores a variety of data and a program for performing overall operations of the electronic device. In particular, the memory 130 temporarily stores graphic information received from the processor 100, and provides the graphic information to the display unit 110.

According to an exemplary embodiment of the present invention, the virtual key input unit 140 announces an occurrence of a partial display on/off event to the processor 100 when the event occurrence is informed. The virtual key input unit 140 may be informed of the event occurrence by using a hardware device such as a keyboard, a keypad, or a mouse. Alternatively, the virtual key input unit 140 may be informed of the event occurrence by using a software mechanism such as a software event or the like.

Figure 2:
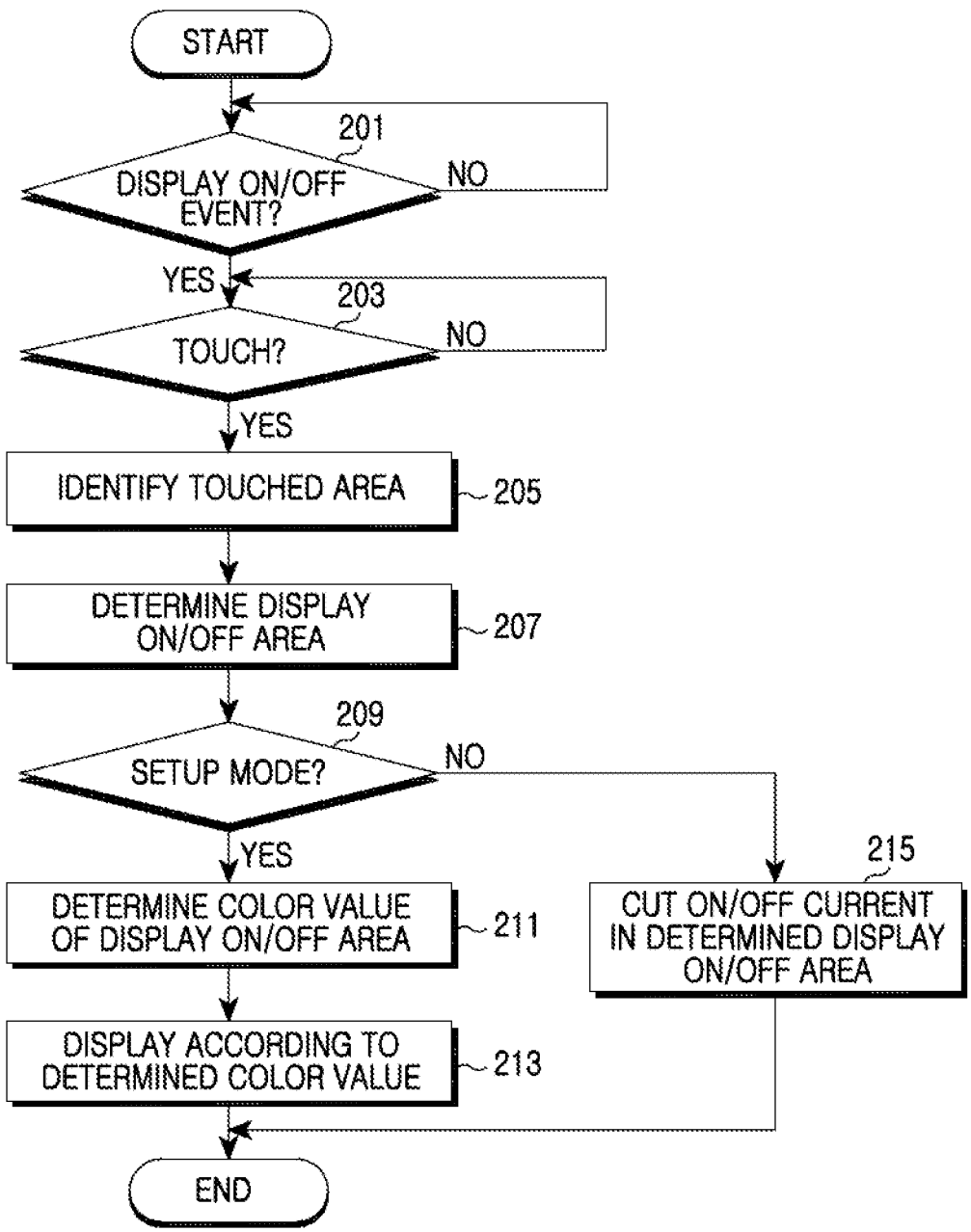
FIG. 2 is a flowchart illustrating an operation of partially turning on/off display of an electronic device according to an exemplary embodiment of the present invention.

FIG. 2 is a flowchart illustrating an operation of partially turning on/off display of an electronic device according to an exemplary embodiment of the present invention.

Referring to FIG. 2, the electronic device determines an occurrence of a partial display on/off event in step 201. The partial display on/off event may occur when a specific key or button is input by a hardware device such as a keyboard, a keypad, or a mouse or when a menu is set up in a software manner.

If it is determined that the partial display on/off event occurs, the electronic device determines whether a screen is touched by a user in step 203. If it is determined that the screen is touched, the electronic device identifies a touched area by using a coordinate provided by the touch input unit 120 in step 205. In this case, when the user touches the screen in a shape of a geometric figure such as a square or a triangle, a closed curve formed by the touch shape or an inner portion of the closed curve may be both determined as the touched area.

In step 207, the electronic device determines a display on/off area according to the touched area or preset environment information. For example, when the environment information is set to "touch area: on", the electronic device may determine the touched area as a display-on area, and when the environment information is set to "touch area: off", the electronic device may determine the touched area as a display-off area. Further, when the environment information is set to "touch area: status reversion", the electronic device may determine the touched area as a display-off area, and when the touched screen is currently in a display-off status, the electronic device may determine the touch area as a display-on area.

In step 209, the electronic device indentifies a setup mode which indicates a mechanism of performing a display on/off by using the preset environment information. That is, the electronic device determines whether it is a normal mode for turning display on/off in a software manner or a save mode for turning display on/off in a hardware manner.

Figure 3:
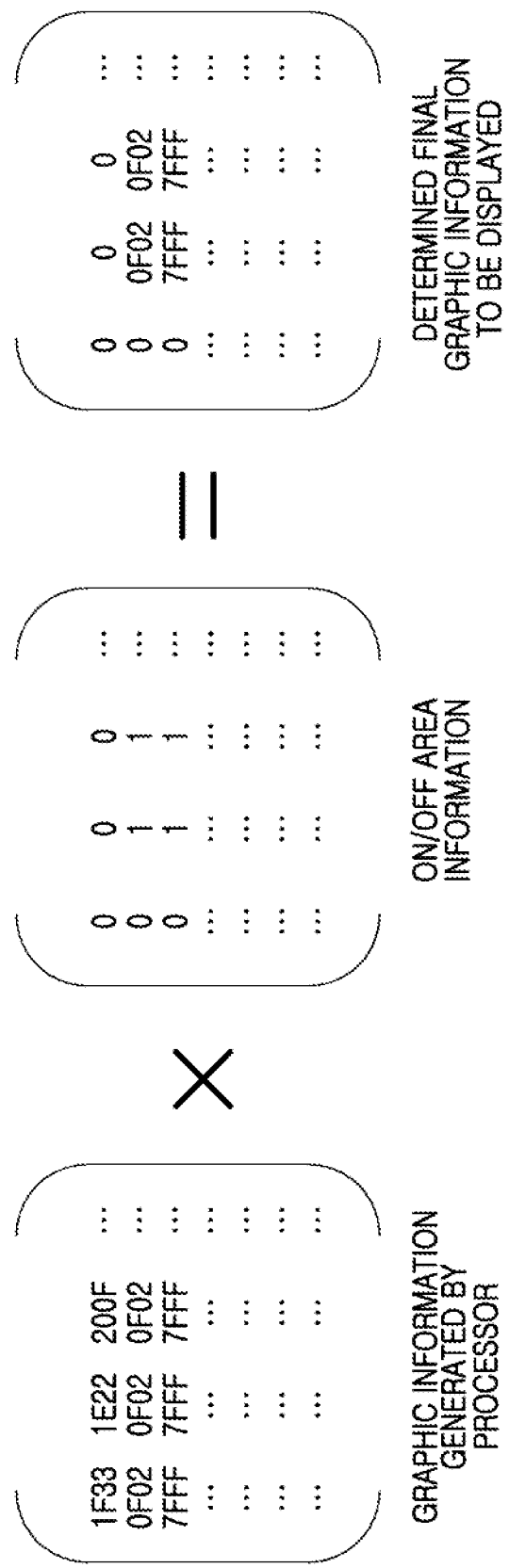
FIG. 3 illustrates a method for generating display graphic information in an electronic device according to an exemplary embodiment of the present invention.

If it is determined that the setup mode is the normal mode, the electronic device determines a color value of the determined display on/off area in step 211. That is, the electronic device performs an AND logical operation on a color value of graphic information which is originally intended to be displayed by the processor 100 and a value which indicates on/off information. For example, as illustrated in FIG. 3, the graphic information generated by the processor 100 is multiplied by information indicating a display on/off status of each area to obtain final graphic information. In this case, the information indicating the display on/off status consists of '0' and '1' and thus a value of original graphic information is maintained in the display-on area. The display-off area is filled with '0' indicating a block color. Herein, instead of performing the AND logical operation on the color value of the original graphic information and the information indicating the display on/off status, the electronic device may simply change a value of the display-off area to a preset value.

In step 213, the electronic device performs a display operation according to the determined color value. Thereafter, the procedure of FIG. 2 ends.

In contrast, if it is determined that the setup mode is the save mode, the electronic device discontinues the supply of current in the determined display on/off area in step 215. That is, the electronic device turns off display by discontinuing the supply of current to pixels in the display-off area through an OLED. Thereafter, the procedure of FIG. 2 ends.

Figure 4A:
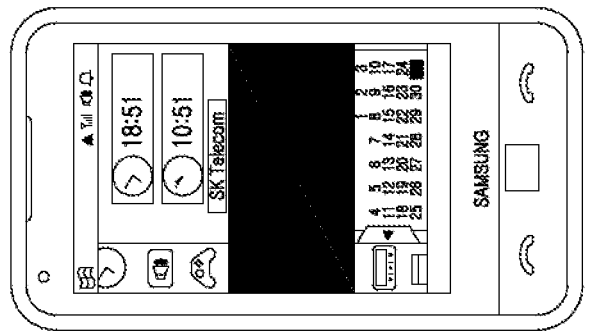
FIGS. 4A to 4C illustrate a screen in which display is partially turned on/off by a user's touch in an electronic device according to an exemplary embodiment of the present invention.
Figure 4A:
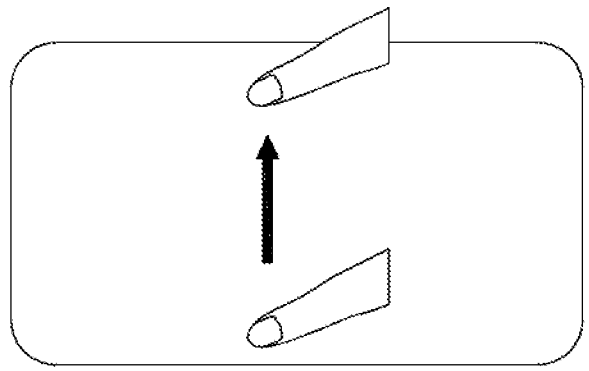
Figure 4A:
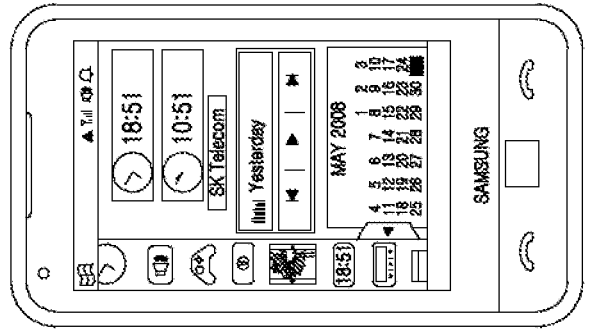
Figure 4B:
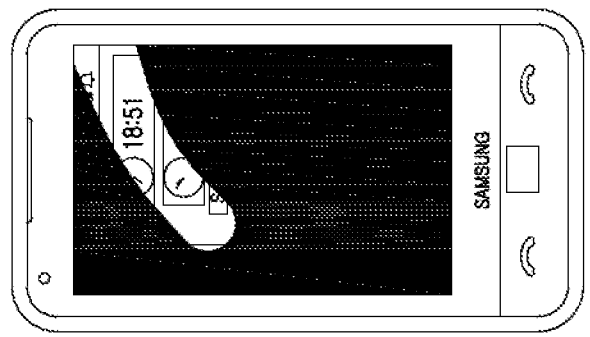
Figure 4B:
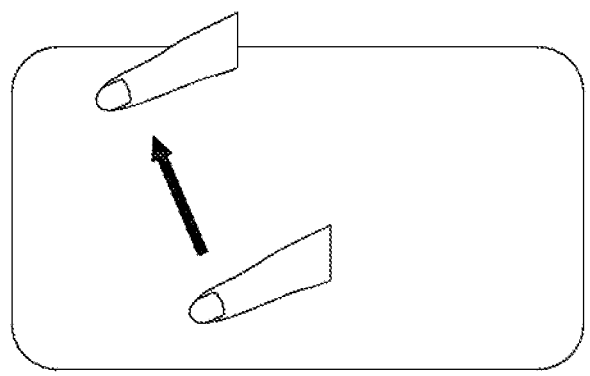
Figure 4B:
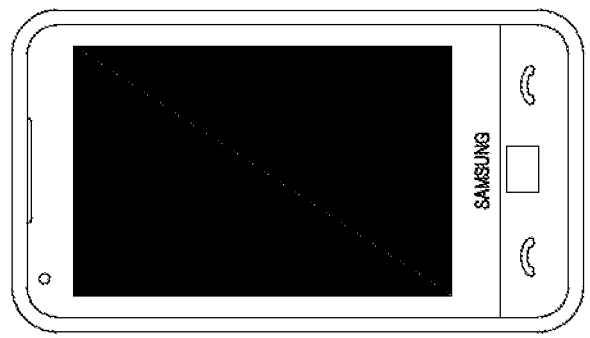
Figure 4C:
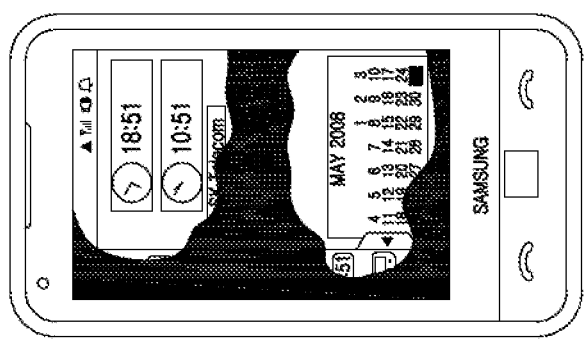
Figure 4C:
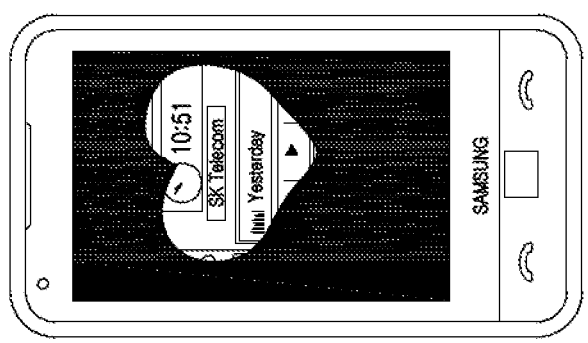

FIGS. 4A to 4C illustrate a screen in which display is partially turned on/off by a user's touch in an electronic device according to an exemplary embodiment of the present invention.

Referring to FIGS. 4A to 4C, when an area for displaying an MP3 player is touched in a waiting screen as illustrated in FIG. 4A, the electronic device may allow the MP3 player to be invisible by turning off display of the touched area.

In addition, when a specific area is touched in an idle state in which display of an LCD is fully off as illustrated in FIGS. 4B and 4C, the electronic device may allow the waiting screen to be visible by turning on display of the touched specific area.

Figure 5A:
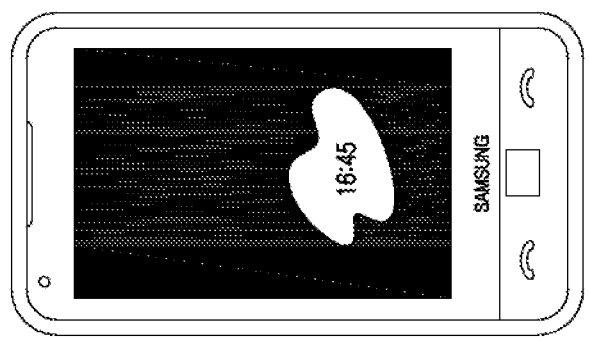
FIGS. 5A to 5C illustrate a screen in which display is partially turned on/off by a user's touch in an electronic device according to an exemplary embodiment of the present invention.
Figure 5A:
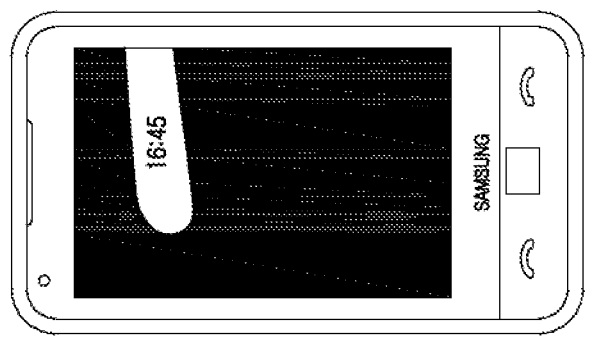
Figure 5B:
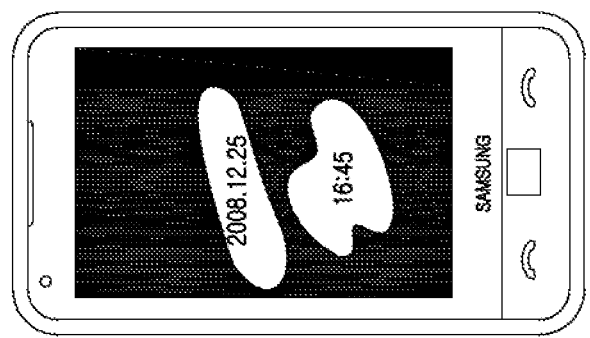
Figure 5B:
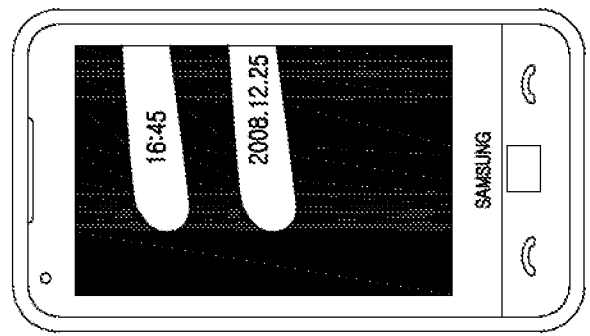
Figure 5C:
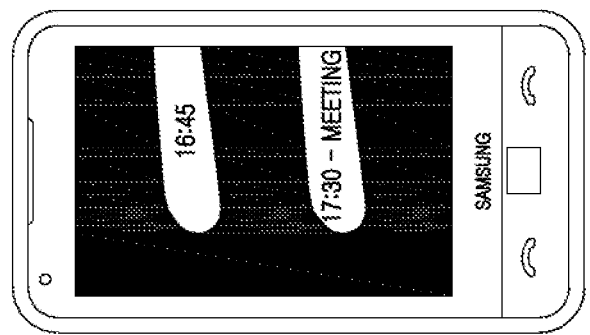
Figure 5C:
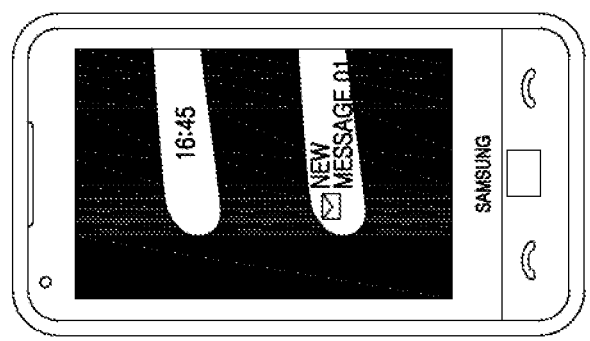

In addition, when an arbitrary area is touched in an idle state in which display is off as illustrated in FIGS. 5A and 5C, the electronic device may display information such as a time, a message reception status, a memo, and a schedule in the touched area by turning on display of the touched area. That is, when the screen is touched in the idle state, the electronic device may display preset specific information by turning on display of the touched area irrespective of a touch position.

FIGS. 5A to 5C illustrate a screen in which display is partially turned on/off by a user's touch in an electronic device according to an exemplary embodiment of the present invention.

Referring to FIGS. 5A to 5C, when an arbitrary area is touched by a user in a display-off status, the electronic device may display time information by turning on display of the touched area as illustrated in FIG. 5A irrespective of a position or shape of the touched area. In addition, when a neighbor area of the touched area is touched in a state where time information is displayed by touching an arbitrary area as described above, the electronic device may display weather information or display message reception information or scheduling information by turning on display of the touched neighbor area as illustrated in FIGS. 5B and 5C. That is, when display of the touched area is turned on in a state where screen display is off, the electronic device may display other preset information according to the number of touches. Of course, the electronic device may perform a display operation by considering not only the number of touches but also other touch attributes such as a touch shape, a touch direction, a touch position, etc.

When an arbitrary area is touched by the user in a state where the screen display is off as illustrated in FIGS. 5A to 5C, the electronic device may display preset information instead of partially displaying a waiting screen corresponding to the touched area. Herein, the preset information may be information determined in a design process or information determined by the user.

Figure 6B:
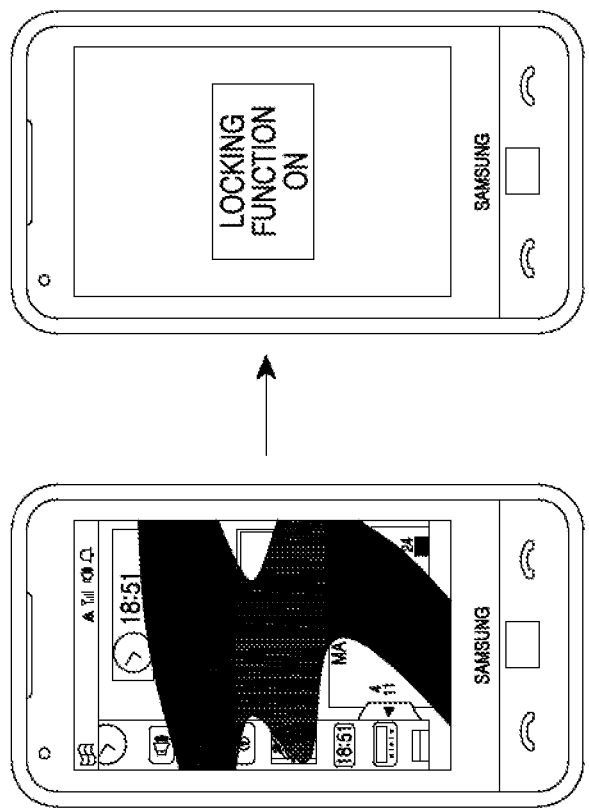
FIGS. 6A and 6B illustrate a screen in which display is partially turned on/off and of which a locking state is established or released in an electronic device according to an exemplary embodiment of the present invention.
Figure 6A:
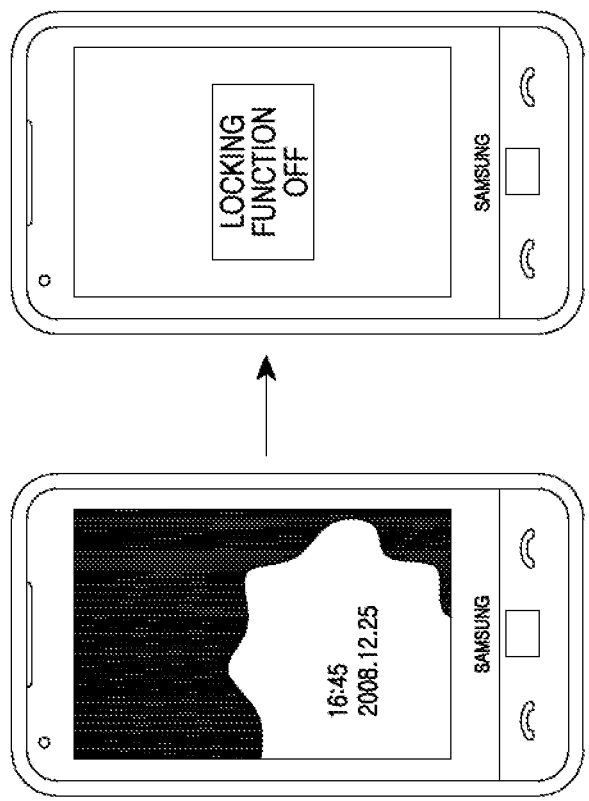

FIGS. 6A and 6B illustrate a screen in which display is partially turned on/off and of which a locking state is established or released in an electronic device according to an exemplary embodiment of the present invention.

Referring to FIG. 6A, when display of an area having a size greater than or equal to a preset size is turned on by a user's touch in an idle state in which display is off, the electronic device may release the locking state of the electronic device. Otherwise, referring to FIG. 6B, when display of the area having the size greater than or equal to the preset size is turned off by a user's touch in a state in which display of the full screen is on, the electronic device may establish the locking state of the electronic device.

Although it has been described above that the electronic device controls display on/off in a software manner or a hardware manner by using a mode setup, if the display unit 110 can be manipulated on a pixel basis as in the OLED, only the hardware mechanism may be used irrespective of the mode setup, and otherwise only the software mechanism may be used without the mode setup.

In addition, although it has been described above that display is turned on/off in the area touched by the touch input unit of the electronic device, the area may be selected by using another device such as a mouse, and then display of the selected area may be turned on/off.

According to exemplary embodiments of the present invention, an electronic device having a touch screen partially turns on/off display of a screen by a user's touch. Thus, only information desired by the user is visible in a full screen, thereby increasing intensity of the information. Further, when using a display unit such as an OLED, power consumption can be decreased.

Certain aspects of the present invention can also be embodied as computer readable code on a computer readable recording medium. A computer readable recording medium is any data storage device that can store data which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for controlling a display of an electronic device, the method comprising:
   selecting, by a processor, a specific area of a screen by a physical touch input on the screen of the display;
   determining, by a processor, a setup mode for performing a display on/off using preset information; and
   switching, by a display unit, a status of the display on/off of the selected specific area of the screen based on the determined setup mode,
   wherein the setup mode is one of a normal mode for changing a color value of the specific area to a preset color so as to temporarily hide any contents displayed in the specific area of the screen, and a save mode for discontinuing a supply of current to the specific area,
   wherein the screen comprises a portion of a panel of the display,
   wherein the selected specific area comprises a closed curve formed by a touch shape of the touch input on the screen and an inner portion of the closed curve formed by a shape of a touch on the screen, and
   wherein the switching of the display on/off status comprises:
      determining whether display of the entire screen is off, and
      when it is determined that the display of the entire screen is off and after the screen is physically touched, displaying preset information in the physically touched area, regardless of a position on the screen of the specific area.

2. The method of claim 1, wherein the switching of the display on/off status comprises:
   determining whether display of the specific area is on or off; and
   if it is determined that the display of the specific area is on, supplying current to a pixel corresponding to the specific area, and, if it is determined that the display of the specific area is off, discontinuing the supply of current to the pixel in the specific area.

3. The method of claim 2, wherein the supplying or discontinuing the supply of the current to the pixel uses an Organic Light Emitting Diode (OLED) capable of supplying or discontinuing the supply of current for each pixel.

4. The method of claim 1, wherein the switching of the display on/off status comprises:
   determining whether display of the specific area is on or off; and
   if it is determined that the display of the specific area is on, determining and displaying a color value to be displayed in the specific area, and, if it is determined that the display of the specific area is off, displaying a preset color value in the specific area.

5. The method of claim 1, wherein preset information is displayed in the selected specific area, regardless of a position on the screen of the specific area.

6. The method of claim 5, wherein the preset information comprises at least one of a time, a date, a message reception status, a schedule, and a memo.

7. The method of claim 1, further comprising switching a locking function on/off status if an area where the display on/off status is switched is greater than or equal to a preset size.

8. The method of claim 1, further comprising:
   recognizing, by a touch input unit, a touch and providing a corresponding attribute to the processor; and
   generating and controlling, by a display manager of the processor, graphic information, which corresponds to the corresponding attribute, to be displayed on the display unit.

9. The method of claim 8, wherein the recognizing of the touch comprises recognizing at least one of a screen touch position, a screen touch direction, a screen touch shape, and a number of screen touches.

10. An electronic device comprising:
    a processor configured to identify a specific area of a screen of a display selected and determining a setup mode for performing a display on/off using preset information;
    a display unit configured to switch a display on/off status of the specific area of the screen under the control of the processor; and
    a touch input unit configured to select the specific area of the screen by a user's physical touch, wherein the specific area comprises a closed curve formed by a touch shape of the touch input on the screen and an inner portion of the closed curve formed by a shape of a touch on the screen,
    wherein the setup mode is one of a normal mode for changing a color value of the specific area to a preset color so as to temporarily hide any contents displayed in the specific area of the screen, and a save mode for discontinuing a supply of current to the specific area,
    wherein the screen comprises a portion of a panel of the display, and
    wherein the display unit is further configured to switch the display on/off status by:
       determining whether display of the entire screen is off, and
       when it is determined that the display of the entire screen is off and after the screen is physically touched, displaying preset information in the physically touched area, regardless of a position on the screen of the specific area.

11. The electronic device of claim 10, wherein the processor determines whether display of the specific area is on or off, and controls the display unit to supply current to a pixel corresponding to the specific area if it is determined that the display of the specific area is on, and to discontinue the supply of current to the pixel in the specific area if it is determined that the display of the specific area is off.

12. The electronic device of claim 11, wherein the display unit is an Organic Light Emitting Diode (OLED) capable of supplying or discontinuing the supply of current for each pixel.

13. The electronic device of claim 10, wherein the processor determines whether display of the specific area is on or off, and controls the display unit to determine and display a color value to be displayed in the specific area if it is determined that the display of the specific area is on, and to display a preset color value in the specific area if it is determined that the display of the specific area is off.

14. The electronic device of claim 10, wherein the processor controls the display unit to display preset information in the selected specific area, regardless of a position on the screen of the specific area.

15. The electronic device of claim 14, wherein the preset information comprises at least one of a time, a date, a message reception status, a schedule, and a memo.

16. The electronic device of claim 10, wherein the processor switches a locking function on/off status if an area where the display on/off status is switched is greater than or equal to a preset size.

17. The electronic device of claim 10, further comprising:
- a touch input unit for recognizing a touch and for providing a corresponding attribute to the processor; and
- a display manager of the processor for generating and controlling graphic information, which corresponds to the corresponding attribute, to be displayed on the display unit.

18. The electronic device of claim 17, wherein the touch input unit recognizes at least one of a screen touch position, a screen touch direction, a screen touch shape, and a number of screen touches.

* * * * *